United States Patent
Kwon et al.

(10) Patent No.: US 10,046,620 B2
(45) Date of Patent: Aug. 14, 2018

(54) COOLING FAN CONTROL SYSTEM AND CONTROL METHOD USING THE SAME

(71) Applicant: Hyundai Motor Company, Seoul (KR)

(72) Inventors: Munsoon Kwon, Gyeonggi-do (KR); Jae Woong Yoo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/193,427

(22) Filed: Jun. 27, 2016

(65) Prior Publication Data

US 2017/0170771 A1    Jun. 15, 2017

(30) Foreign Application Priority Data

Dec. 11, 2015    (KR) .................. 10-2015-0177467

(51) Int. Cl.
| | |
|---|---|
| *G05B 5/00* | (2006.01) |
| *F01P 7/02* | (2006.01) |
| *B60H 1/00* | (2006.01) |
| *B60K 11/06* | (2006.01) |
| *G05B 11/32* | (2006.01) |
| *B60H 1/32* | (2006.01) |

(Continued)

(52) U.S. Cl.
CPC ....... *B60H 1/00985* (2013.01); *B60H 1/3208* (2013.01); *B60K 11/06* (2013.01); *G05B 11/32* (2013.01); *B60H 2001/3251* (2013.01); *B60H 2001/3277* (2013.01); *B60K 11/085* (2013.01); *H02P 29/60* (2016.02)

(58) Field of Classification Search
None
See application file for complete search history.

(56) References Cited

U.S. PATENT DOCUMENTS 8,833,313 B2 *  9/2014  Lockwood ........... B60K 11/085
                                              123/41.04
2001/0039926 A1 * 11/2001  Kobayashi ........... B60H 1/3205
                                              123/41.12

(Continued)

FOREIGN PATENT DOCUMENTS

JP        2000-274243 A    10/2000
KR    10-2004-0091307 A    10/2004
(Continued)

*Primary Examiner* — Bentsu Ro
*Assistant Examiner* — Zemenay Truneh
(74) *Attorney, Agent, or Firm* — Mintz Levin Cohn Ferris Glovsky and Popeo, P.C.; Peter F. Corless

(57) ABSTRACT

A cooling fan control system is provided. The system includes a sensor unit that includes a temperature sensor that generates a first output value corresponding to a coolant temperature and an air-conditioner pressure transducer that generates a second output value corresponding to an air-conditioner pressure and a cooling control portion. The cooling control portion generates a control condition based on the first output value and the second output value and adjusts a rotation speed of a cooling motor based on the control condition. The control condition includes a target control condition formed as a region including a cross point of the first output value and the second output value. The cooling control portion adjusts the rotation speed of the cooling motor to cause the first output value and the second output value to correspond to the target control condition.

13 Claims, 5 Drawing Sheets

(51) Int. Cl.
*B60K 11/08* (2006.01)
*H02P 29/60* (2016.01)

(56) References Cited

U.S. PATENT DOCUMENTS

2009/0050385 A1* 2/2009 Guilfoyle ............... B60K 11/04
180/68.1
2014/0334300 A1* 11/2014 Horihata ........... H04L 12/40039
370/230

FOREIGN PATENT DOCUMENTS

KR       10-1601230 B1    3/2016
KR    10-2017-0062304 A   6/2017

* cited by examiner

COOLING FAN CONTROL SYSTEM AND CONTROL METHOD USING THE SAME

CROSS-REFERENCE TO RELATED APPLICATION

This application claims priority to and the benefit of Korean Patent Application No. 10-2015-0177467 filed in the Korean Intellectual Property Office on Dec. 11, 2015, the entire contents of which are incorporated herein by reference.

BACKGROUND (a) Field of the Invention

The present invention relates to a cooling fan control system for a vehicle, and more particularly, to a cooling fan control system that bidirectionally communicates with an EMS and an ECU.

(b) Description of the Related Art

Generally, an engine compartment of a vehicle is provided with a cooling fan for decreasing temperature of the engine compartment. The cooling fan for decreasing temperature of a coolant of an air-conditioner of the vehicle is installed within the vehicle. Since the temperature of the engine compartment is associated with performance of the vehicle, temperature control of the engine compartment is an important factor.

In the related art, bidirectional communication between an engine management system (EMS) and an engine control unit (ECU) and a cooling fan control system for an engine compartment is impossible, and the cooling fan control system for the engine compartment is separated from a motor and thus is not capable of detecting a state of the motor, thus it may be difficult to compensate a rotation speed of the motor and a rotation speed of the engine based on an internal temperature of the engine. Moreover, components for operating the cooling fan for the engine compartment are complex, a voltage drop may occur due to wires connected to the components, and a disconnection of the wires may occur, thus it may be difficult to stably supply electric power to the cooling fan.

The above information disclosed in this section is merely for enhancement of understanding of the background of the invention and therefore it may contain information that does not form the prior art that is already known in this country to a person of ordinary skill in the art.

SUMMARY

The present invention provides a cooling fan control system and a control method using the same that may bidirectionally communicate with an EMS and an ECU and detect a state of the cooling fan motor. In addition, the present invention provides a cooling fan control system and a control method using the same that may compensate and adjust a rotation speed of a cooling fan motor and a rotation speed of an engine based on an internal temperature of the engine, and that may supply electric power to the cooling fan motor.

Technical objects of the present invention are not limited by the above described technical objects, and other technical objects that are described will be clearly comprehended by a person of ordinary skill in the art.

An exemplary embodiment of the present invention provides a cooling fan control system that may include: a sensor unit comprising a temperature sensor configured to generate a first output value that corresponds to a coolant temperature and an air-conditioner pressure transducer configured to generate a second output value that corresponds to an air-conditioner pressure; and a cooling control portion configured to generate a control condition based on the first output value and the second output value and adjust a rotation speed of a cooling motor based on the control condition. The control condition may include a target control condition formed as a region including a cross point of the first output value and the second output value, and the cooling control portion (e.g., controller) may be configured to adjust the rotation speed of the cooling motor so that the first output value and the second output value correspond to the target control condition.

The region of the target control condition may be formed between a third output value that is greater by a reference output value than the cross point and a fourth output value that is less by the reference output value than the cross point, and the control condition may include a first control condition and a second control condition formed in a region other than the target control condition. The region of the target control condition may be formed between a first constant value that corresponds to the third output value and a second constant value that corresponds to the fourth output value, and the first constant value and the second constant value may be proportional to the coolant temperature and the air-conditioner pressure.

Another exemplary embodiment of the present invention provides a cooling fan control method that may include: generating a first output value that corresponds to a coolant temperature; generating a second output value that corresponds to an air-conditioner pressure; determining whether a communication state is abnormal by a cyclic redundancy check (CRC) or by an open or short circuit of a communication wire; generating a control condition based on the first output value and the second output value; and adjusting a rotation speed of a cooling motor based on the control condition. The generating of the control condition may include forming a target control condition formed as a region including a cross point of the first output value and the second output value, and the adjustment of the rotation speed of the cooling motor may include adjusting the rotation speed of the cooling motor so that the first output value and the second output value correspond to the target control condition.

The forming of the target control condition may be performed between a third output value that is greater by a reference output value than the cross point and a fourth output value that is less by the reference output value than the cross point, and the forming of the control condition may include generating a first control condition and a second control condition formed in a region other than the target control condition. The forming of the target control condition may be performed between a first constant value that corresponds to the third output value and a second constant value that corresponds to the fourth output value, and the first constant value and the second constant value may be proportional to the coolant temperature and the air-conditioner pressure.

The cooling fan control method may further include: determining whether the first output value and the second output value correspond to the target control condition; determining whether the first output value and the second output value correspond to the first control condition; and determining whether the first output value and the second output value correspond to the second control condition. The adjustment process may include maintaining a current rotation speed of the cooling motor when the first output value and the second output value correspond to the target control condition, and adjusting the rotation speed of the cooling motor so that the first output value and the second output value correspond to the target control condition when the first output value and the second output value correspond to the second control condition.

The cooling fan control method may further include, when the first output value and the second output value do not correspond to the target control condition and the second control condition, determining the first output value and the second output value to be the first control condition, and adjusting the rotation speed of the cooling motor so that the first output value and the second output value correspond to the target control condition when the first output value and the second output value correspond to the first control condition. The cooling fan control method may further include: determining whether the second output value is changed after a reference period of time; determining whether the first output value is changed when the second output value is changed; and determining the communication state to be abnormal when the first output value is changed. The cooling fan control method may further include determining whether the first output value is changed when the second output value is not changed, and displaying a warning when the first output value is not changed.

Yet another exemplary embodiment of the present invention provides a cooling fan control method that may include: generating a first output value that corresponds to a coolant temperature; generating a second output value that corresponds to an air-conditioner pressure; generating a control condition based on the first output value and the second output value; adjusting a rotation speed of a cooling motor based on the control condition; determining whether a current vehicle speed is equal to or greater than a first reference vehicle speed; and determining whether the current vehicle speed is equal to or greater than a second reference vehicle speed. The generating of the control condition may include forming a target control condition as a region including a cross point of the first output value and the second output value, and the adjustment of the rotation speed of the cooling motor may include adjusting the rotation speed of the cooling motor so that the first output value and the second output value correspond to the target control condition.

The adjustment process may include: operating the cooling motor to maximize the rotation speed of the cooling motor when the current vehicle speed is equal to or greater than the first reference vehicle speed; operating the cooling motor to increase the rotation speed of the cooling motor to a first rotation speed when the current vehicle speed is not equal to or greater than the first reference vehicle speed and is equal to or greater than the second reference vehicle speed; and operating the cooling motor to decrease the rotation speed of the cooling motor to a second rotation speed when the current vehicle speed is not equal to or greater than the first reference vehicle speed and is not equal to or greater than the second reference vehicle speed.

The cooling fan control method may further include: determining whether the second output value is changed after a reference period of time; determining whether the first output value is changed when the second output value is changed; and when the first output value is not changed, determining whether the current vehicle speed is equal to or greater than the first reference vehicle speed and determining whether the current vehicle speed is equal to or greater than the second reference vehicle speed.

The cooling fan control method may further include determining whether the first output value is changed when the second output value is not changed, and when the first output value is changed, determining whether the current vehicle speed is equal to or greater than the first reference vehicle speed and determining whether the current vehicle speed is equal to or greater than the second reference vehicle speed. The cooling fan control method may further include determining whether the first output value is changed when the second output value is not changed, and displaying a warning when the first output value is not changed.

According to the exemplary embodiment of the present invention, a cooling fan control system may bidirectionally communicate with an EMS and an ECU, and a state of the cooling fan motor may be detected. Moreover, it may be possible to compensate and adjust a rotation speed of a cooling fan motor and a rotation speed of an engine based to an internal temperature of the engine, and to supply electric power to the cooling fan motor.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
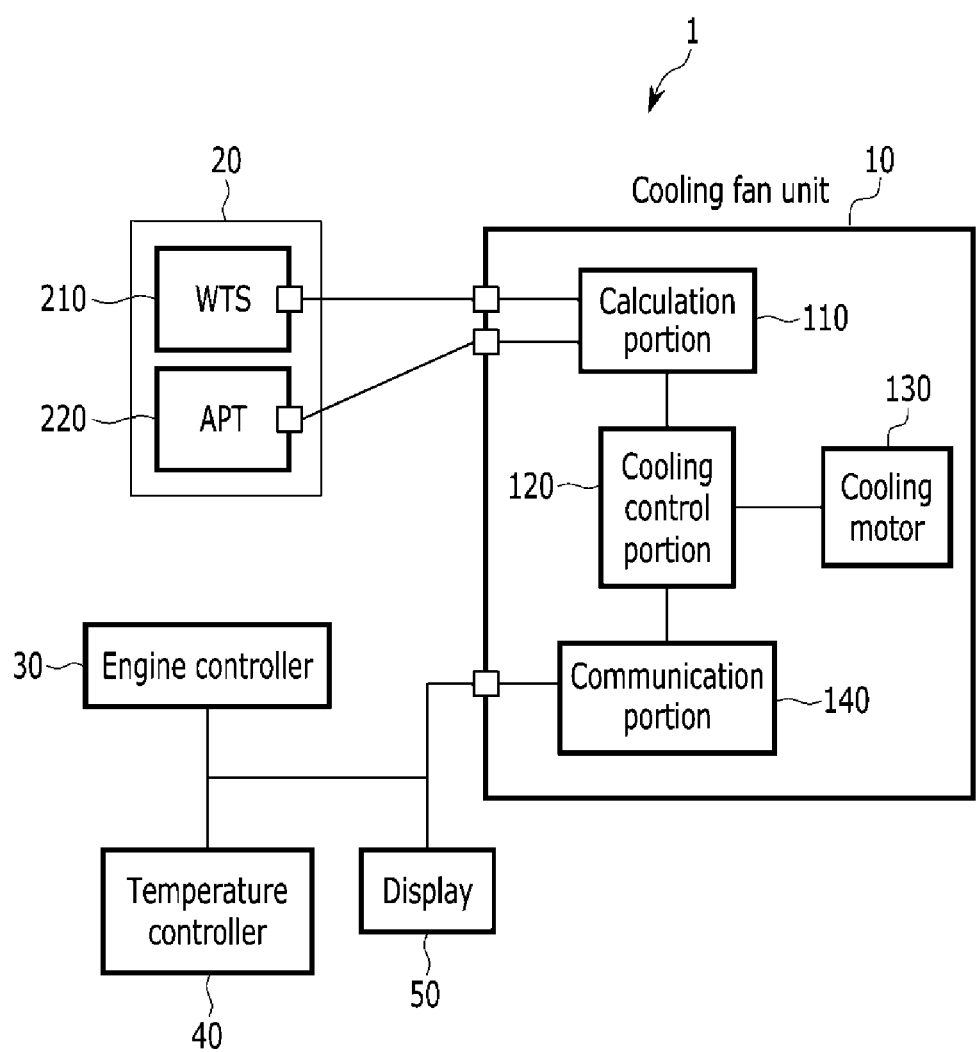
FIG. 1 illustrates a block diagram of a cooling fan control system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments disclosed in the present specification will be described in detail with reference to the accompanying drawings. In the present specification, the same or similar components will be denoted by the same or similar reference numerals, and a duplicate description thereof will be omitted. The terms "module" and "unit" for components used in the following description are used only in order to make the specification easier. Therefore, these terms do not have meanings or roles that distinguish them from each other by themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like, will be used only to describe various components, and are not interpreted as limiting these components. The terms are only used to differentiate one component from other components. It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected to or coupled to another component without any other component intervening therebetween.

Referring to FIG. 1, a cooling fan control system for an engine compartment according to an exemplary embodiment of the present invention will now be described. FIG. 1 illustrates a block diagram of a cooling fan control system according to an exemplary embodiment of the present invention. Referring to FIG. 1, a cooling fan control system 1 according to the exemplary embodiment of the present invention exemplary embodiment may include a cooling fan unit 10, a sensor unit 20, an engine controller 30, an automatic temperature controller 40, and a display 50.

The cooling fan unit 10 may include a calculation portion 110, a cooling control portion 120, a cooling motor 130, and a communication portion 140, and the cooling motor 130 may be operated based on a control condition of the calculation portion 110. The calculation portion 110 may be configured to generate control conditions including a first control condition, a target control condition, and a second control condition using an output value (e.g., an output voltage Vt) of a temperature sensor (WTS) 210 and an output value (e.g., an output voltage Vp) of an air-conditioner pressure transducer (APT) 220, and then may be configured to transmit the control conditions to the cooling control portion 120. The APT 220 may be configured to generate the output value (Vp) by converting a pressure change of an air-conditioner coolant into a voltage. Hereinafter, in the exemplary embodiment of the present invention, the pressure of the air-conditioner indicates the pressure of the air-conditioner coolant.

A method of the calculation portion 110 generating the control condition will be described later. The cooling control portion 120 may be configured to determine whether a communication state with the communication portion 140 is abnormal by performing a cyclic redundancy check (CRC), or by detecting an open or short circuit of a CAN communication wire, but the present invention is not limited thereto.

The cooling control portion 120 may be configured to determine whether an engine is started using information of the engine, and determine whether the air-conditioner is in an on-state using information of the air-conditioner. After the air-conditioner is in the on-state, when the output value (Vt) of the WTS 210 and the output value (Vp) of the APT 220 are not changed, the cooling control portion 120 may be configured to determine that the output value (Vt) of the WTS 210 and the output value (Vp) of the APT 220 are abnormal. The cooling control portion 120 may then be configured to generate a control signal by determining that the output value (Vt) of the WTS 210 and the output value (Vp) of the APT 220 correspond to any among the control conditions. In particular, the cooling control portion 120 may be configured to determine that the output value (Vt) of the WTS 210 and the output value (Vp) of the APT 220 are in the first control condition or the second control condition when the output value (Vt) of the WTS 210 and the output value (Vp) of the APT 220 are not in a target control condition (B) of FIG. 2.

The cooling control portion 120 may be configured to operate the cooling motor 130 to cause the output value (Vt) of the WTS 210 and the output value (Vp) of the APT 220 to correspond to the target control condition (B) using the generated control signal. A specific method of controlling the cooling motor 130 will now be described. When the output value (Vt) of the WTS 210 and the output value (Vp) of the APT 220 are determined to be abnormal, the cooling control portion 120 may be configured to generate a warning control signal. A rotation speed of the cooling motor 130 may be adjusted by a control signal of a cooling control portion 120. The cooling motor 130 may be configured to rotate a cooling fan (not shown) to cool the coolant. The coolant corresponds to a coolant for cooling the engine and a coolant of the air-conditioner, but is not limited thereto.

The communication portion 140 may connect among the cooling fan unit 10 and the engine controller 30, the automatic temperature controller 40, and the display 50 via a controller area network (CAN). The communication portion may be configured to transmit information such as an engine signal, an air-conditioner signal, a vehicle speed, an engine speed, a fuel amount, a coolant temperature, etc. to the cooling control portion 120. The sensor unit 20 may include the WTS 210 and the APT 220, and may be configured to generate the output value (Vout) (refer to FIG. 2) based on the coolant temperature and the pressure of the air-conditioner. A specific method of generating output value (Vout) of the sensor unit 20 will be described later.

The WTS 210 may be configured to measure or detect the temperature of the coolant, and generate the output value (Vt) based on the measured temperature of the coolant. The APT 220 may be configured to generate the output value (Vp) based on the pressure of the air-conditioner. The engine controller 30 may be configured to transmit information associated with the engine such as the starting of the engine, the engine speed, engine temperature, etc. to the communication portion 140 and the display 150 via the CAN communication. The engine controller may be the EMS or the ECU, but is not limited thereto.

The automatic temperature controller 40 may be configured to operate the air-conditioner to maintain a vehicle interior temperature at a predetermined temperature set by a driver, and may be configured to generate signals associated with the air-conditioner such as whether the air-conditioner operates, the interior temperature, the set predetermined temperature, a wind strength of the air-conditioner, etc. The display 50 may be a cluster configured to receive and display the information such as the engine signal, the air-conditioner signal, the vehicle speed, the engine speed, the fuel amount, the coolant temperature, etc. via the CAN communication, but is not limited thereto. The display 50 may be configured to display a fault or failure of the WTS 210 and the APT 220 based on the warning control signal.

Figure 2:
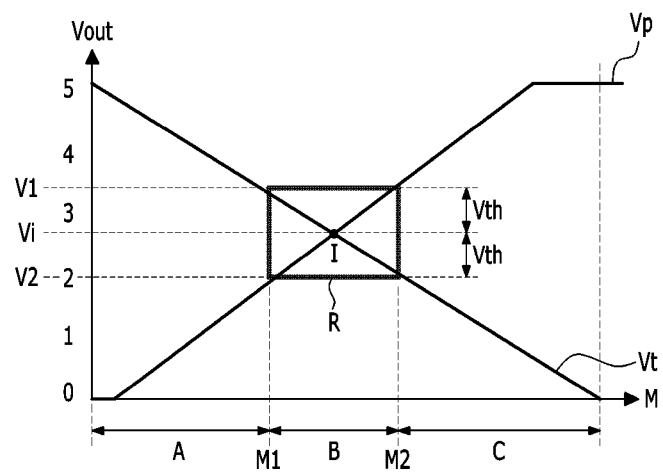
FIG. 2 illustrates a graph of control conditions generated by a calculation portion of FIG. 1 according to an exemplary embodiment of the present invention.

Hereinafter, a method in which the control conditions are generated by the calculation portion of FIG. 1 will be described with reference to FIG. 2. FIG. 2 illustrates a graph of the control conditions generated by the calculation portion of FIG. 1. The calculation portion 110 may be configured to generate an output value (Vout) that corresponds to a constant (M) based on the output value (Vt) of the WTS 210 and the output value (Vp) of the APT 220. In particular, the constant (M) is proportional to temperature and pressure.

The calculation portion 110 may be configured to detect a contact point (I) of the output value (Vt) and the output value (Vp). The calculation portion 110 may then be configured to respectively set a range between an output value V1 that is greater by a reference output value (e.g., a reference voltage Vth, about 1.3 V) than an output value (Vi) of the contact point (I) and an output value V2 that is less by the reference output value than the output value (Vi) as a target output value range (V1-V2), and set a constant interval (B) of a range (R) that corresponds to a constant range (M1-M2) corresponding to the target output value range (V1-V2) as a target control condition (B). In other words, the calculation portion 110 has the contact point (I), and may be configured to set the constant interval (B) of the range (R) that corresponds to the target output value range (V1-V2) and the constant range (M1-M2) as the target control condition (B). In addition, the calculation portion 110 may be configured to set a constant range of less than the constant (M1) as a first control condition (A), and a constant range of greater than the constant (M2) as a second control condition (C).

The control conditions may be predetermined control conditions, but are not limited thereto, and the calculation portion 110 may be configured to generate control conditions using the output value (Vt) of the WTS 210 and the output value (Vp) of the APT 220 which are currently generated. The control conditions set by the calculation portion 110 may correspond to those represented in Table 1, but are not limited thereto, and the target control condition may be variously set based on the output values (Vt) and (Vp) of the WTS and the APT 220 that are installed in the vehicle.

TABLE 1

|  | Vt | Vp | Vehicle state |
|---|---|---|---|
| First control condition | 3.6 V-5.0 V | 0 V-2.0 V | Initial operation state of engine and air-conditioner |
| Target control condition | 2.0 V-3.6 V | 2.0 V-3.6 V | Target control condition (reference values of WTS and APT) |
| Second control condition | 0 V-2.0 V | 3.6 V-5.0 V | Overload state of engine and air-conditioner |

Figure 3:
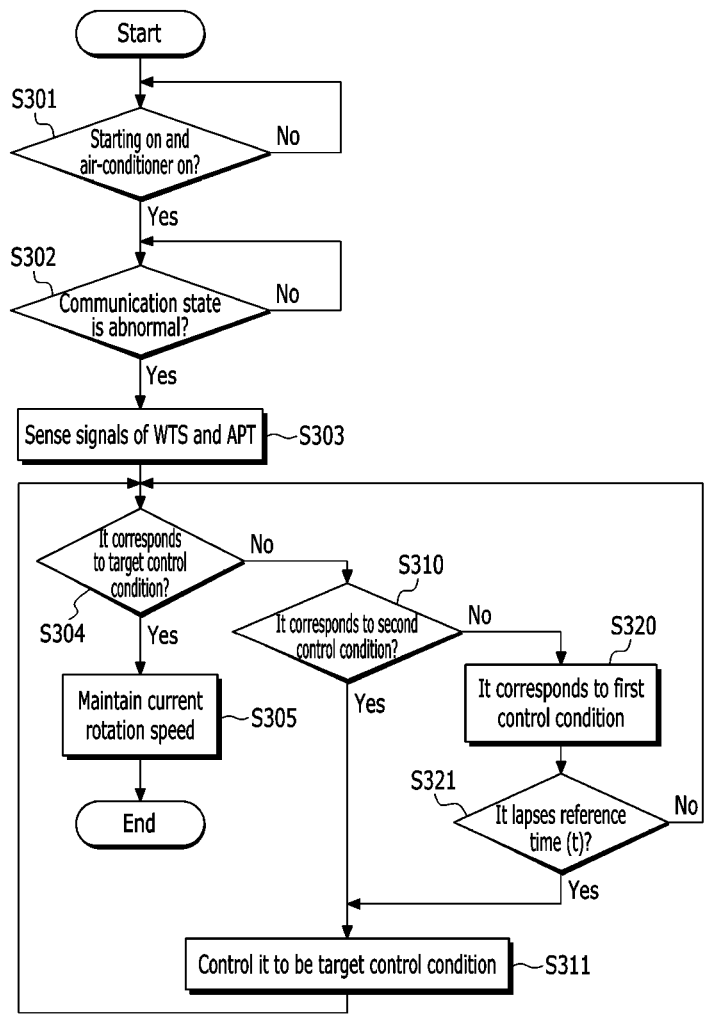
FIG. 3 illustrates a flowchart of a cooling fan control method according to an exemplary embodiment of the present invention when a communication state is abnormal according to an exemplary embodiment of the present invention.

FIG. 3 illustrates a flowchart of a cooling fan control method according to an exemplary embodiment of the present invention when a communication state is abnormal. Hereinafter, when a communication state is abnormal, a cooling fan control method according to the exemplary embodiment of the present invention will be described with reference to FIG. 3.

The cooling control portion 120 may be configured to determine whether the vehicle is started using the information of the engine, and determine whether the air-conditioner operates using the information of the air-conditioner, at step S301. When the vehicle is started and the air-conditioner is in an on-state, the cooling control portion 120 may be configured to determine whether the communication state is abnormal at step S302 (e.g., whether the information has been properly communicated or communicated without error).

When the communication state is abnormal, the calculation portion 110 may be configured to generate the first control condition, the target control condition, and the second control condition using the output value (Vt) of the WTS 210 and the output value (Vp) of the APT 220 at step S303. The cooling control portion 120 may be configured to determine whether the sensed output value (Vt) of the WTS 210 and the sensed output value (Vp) of the APT 220 respectively correspond to the target control condition (B) at step S304.

When the output value (Vt) and the output value (Vp) correspond to the target control condition (B), the cooling control portion 120 may be configured to generate a control signal to maintain a current rotation speed of the cooling motor 130 at step S305. When the output value (Vt) and the output value (Vp) do not correspond to the target control condition (B), the cooling control portion 120 may be configured to determine whether the output value (Vt) of the WTS 210 or the output value (Vp) of the APT 220 corresponds to the second control condition (C) at step S310.

When the output value (Vt) or the output value (Vp) of the APT 220 corresponds to the second control condition, the cooling control portion 120 may be configured to generate a control signal to cause the output value (Vt) of the WTS 210 and the output value (Vp) of the APT 220 to correspond to the target control condition (B) at step S311. The cooling control portion 120 may be configured to recognize the output value (Vt) of the WTS 210 and the output value (Vp) of the APT 220 to correspond to the first control condition (A) at step S320.

After the vehicle is started, the cooling control portion 120 may be configured to determine whether a reference time (t; e.g. about 10 min) lapses at step S320. When the reference time (t) does not lapse, the cooling control portion 120 may be configured to determine that the engine is in the on-state and the air-conditioner is in the initial operation state. When the vehicle is started and the reference time (t) lapses, the cooling control portion 120 may be configured to generate a control signal to cause the output value (Vt) of the WTS 210 and the output value (Vp) of the APT 220 to correspond to the target control condition (B) at step S320.

Figure 4:
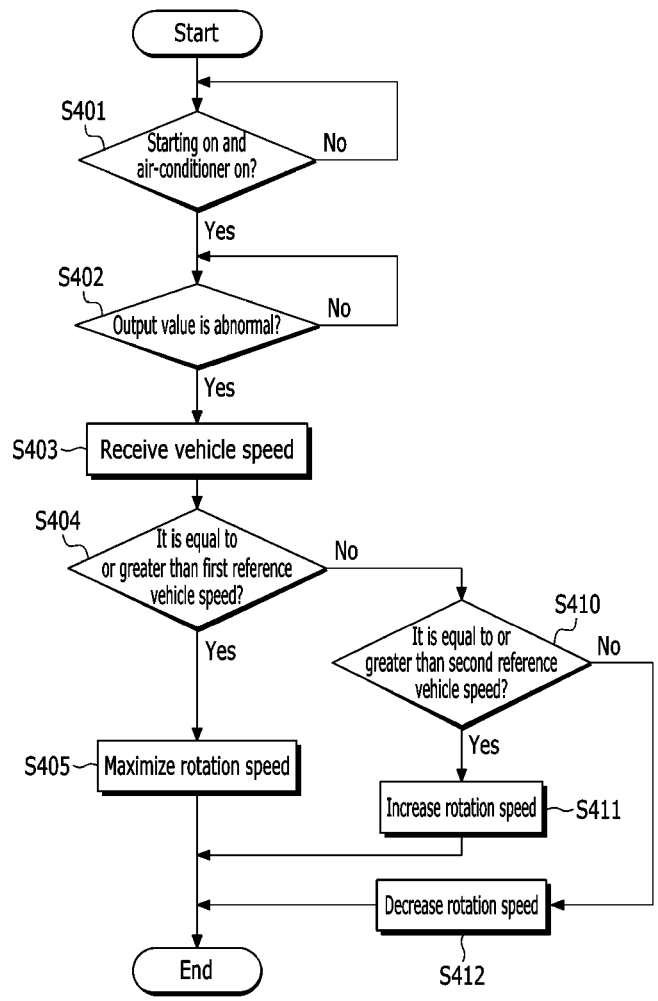
FIG. 4 illustrates a flowchart of a cooling fan control method when an output signal of a temperature sensor or an air-conditioner pressure transducer of FIG. 1 is abnormal according to an exemplary embodiment of the present invention.

FIG. 4 illustrates a flowchart of the cooling fan control method when an output signal of the WTS or the APT of FIG. 1 is abnormal. Hereinafter, when an output value of the WTS or APT is abnormal, the cooling fan control method according to the exemplary embodiment of the present invention will be described with reference to FIG. 4.

The cooling control portion 120 may be configured to determine whether the vehicle is started using the information of the engine, and determine whether the air-conditioner operates using the information of the air-conditioner at step S401. While the vehicle is started and the air-conditioner is in the on-state, when the output value (Vt) of the WTS 210 or the output value (Vp) of the APT 220 is not changed even after the reference time (t) lapses, the cooling control portion 120 may be configured to determine that the output value (Vt) of the WTS 210 or output value (Vp) of the APT 220 is abnormal at step S402. After the reference period of time (t), when the output value (Vt) of the WTS 210 or the output value (Vp) of the APT 220 is changed, the cooling control portion 120 may be configured to determine that the output value (Vt) of the WTS 210 or the output value (Vp) of the APT 220 is normal.

When the output values (Vt and Vp) are abnormal, the cooling control portion 120 may be configured to receive a current speed of the vehicle at step S403. Whether the vehicle speed is equal to or greater than a first reference vehicle speed (e.g., about 50 KPH) may then be determined at step S404. When the current vehicle speed is equal to or greater than the first reference vehicle speed, the cooling control portion 120 may be configured to generate a control signal to maximize the rotation speed of the cooling motor 130 at step S405. When the vehicle speed is less than the first reference vehicle speed, the cooling control portion 120 may be configured to determine whether the vehicle speed is equal to or greater than the second reference vehicle speed (e.g., about 10 KPH) at step S410.

When the vehicle speed is less than the first reference vehicle speed and is equal to or greater than the second reference vehicle speed (e.g., 50 KPH≤vehicle speed<10 KPH), the cooling control portion 120 may be configured to generate a control signal to increase the rotation speed of the cooling motor 130 to be the first rotation speed, for example, increases to about 80% of the maximum rotation speed thereof. When the vehicle speed is less than the second reference vehicle speed, the cooling control portion 120 may be configured to generate a control signal to decrease the rotation speed of the cooling motor 130 to be the second rotation speed, for example, decreases to about 60% of the maximum rotation speed at step S412.

Figure 5:
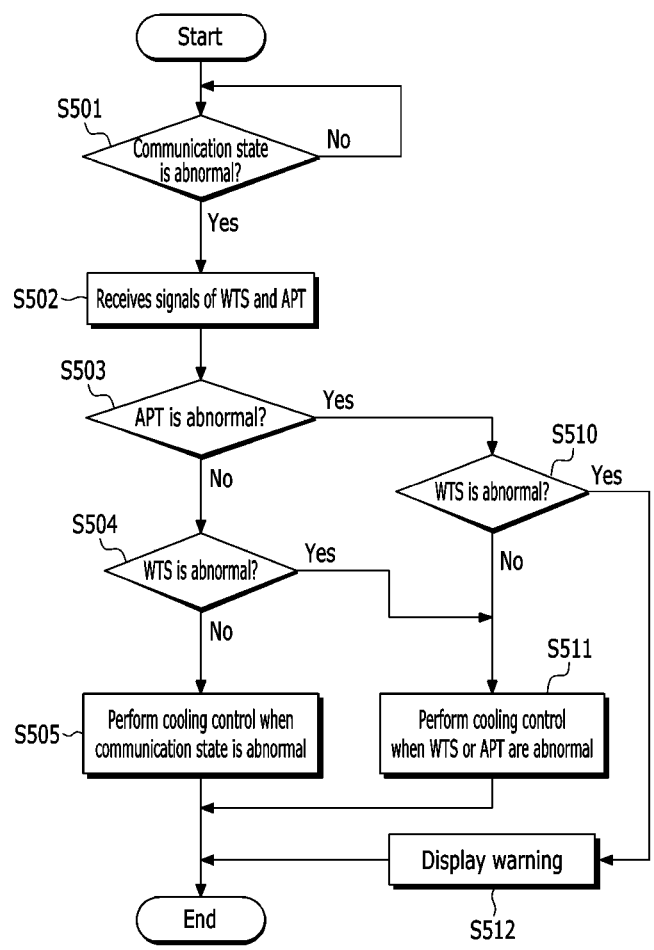
FIG. 5 illustrates a flowchart of a cooling fan control method when a communication state is abnormal and when an output signal of a temperature sensor or an air-conditioner pressure transducer is abnormal according to an exemplary embodiment of the present invention.

FIG. 5 illustrates a flowchart of the cooling fan control method when a communication state is abnormal and when an output signal of the WTS or the APT is abnormal. Hereinafter, when a communication state is abnormal and when an output signal of the WTS or the APT is abnormal, the cooling fan control method according to the exemplary embodiment of the present invention is as described with reference to FIG. 5.

The cooling control portion 120 may be configured to determine whether a communication state with the communication portion 140 is abnormal at step S501. The cooling control portion 120 may be configured to determine whether the vehicle is started using the information of the engine, and determine whether the air-conditioner operates using the information of the air-conditioner.

When the communication state is abnormal, the calculation portion 110 may be configured to receive the output value (Vt) of the WTS 210 and the output value (Vp) of the APT 220, and then generate the first control condition, the target control condition, and the second control condition using the output value (Vt) and the output value (Vp) at step S502. After the vehicle is started and the air-conditioner is in the on-state, and then even after reference period of time (t) lapses, when the output value (Vp) of the APT 220 is not changed, the APT may be determined to be abnormal (e.g., a failure may be detected) at step S503.

When the output value (Vp) of the APT 220 is normal and when the output value (Vt) of the WTS 210 is not changed after the reference time (t), the cooling control portion 120 may be configured to determine the WTS 210 to be abnormal (e.g., a failure may be detected) at step S504. When the output value (Vt) of the WTS 210 is changed after the reference period of time (t), the cooling control portion 120 may be configured to determine the WTS 210 to be normal (e.g., operating without failure or malfunction). When the output value (Vt) of the WTS 210 and the output value (Vp) of the APT 220 are normal, the cooling control portion 120 may be configured to perform the same control as the cooling control in the abnormal communication state described with reference to FIG. 3 at step S505. Accordingly, a detailed description thereof will be omitted.

When the output value (Vp) of the APT 220 is abnormal and when the output value (Vt) of the WTS 210 is not changed after the reference period of time (t), the cooling control portion 120 may be configured to determine the WTS 210 to be abnormal at step S510. When the output value (Vt) of the WTS 210 is changed after the reference period of time (t), the cooling control portion 120 may be configured to the WTS 210 to be normal.

When the output value (Vp) of the APT 220 is abnormal, or the output value (Vt) of the WTS 210 is abnormal, the cooling control portion 120 may be configured to perform the same control method as the cooling fan control method performed when the output value of the temperature sensor or the air-conditioner pressure transducer is abnormal described with reference to FIG. 4, at step S511. Accordingly, a detailed description thereof will be omitted. When both the output value (Vp) of the APT 220 and the output value (Vt) of the WTS 210 are abnormal, the cooling control portion 120 may be configured to generate a warning control signal and the display 50 may be configured to display a fault warning at step S512.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims. Therefore, the above-detailed description is not to be interpreted as being restrictive, but is to be considered as being illustrative. The scope of the present invention is to be determined by reasonable interpretation of the claims, and all alterations within equivalences of the present invention fall within the scope of the present invention.

DESCRIPTION OF SYMBOLS

1: cooling fan control system
10: cooling fan unit
20: sensor unit
30: engine controller
40: temperature controller
50: display

What is claimed is:

1. A cooling fan control system for a vehicle, comprising:
a sensor unit including a temperature sensor configured to generate a first output value that corresponds to a coolant temperature and an air-conditioner pressure transducer configured to generate a second output value that corresponds to an air-conditioner pressure; and
a cooling control portion configured to generate a control condition based on the first output value and the second output value and adjust a rotation speed of a cooling motor based on the control condition and determine whether a communication state is abnormal by a cyclic redundancy check (CRC) or by an open or short circuit of a communication wire,
wherein the control condition includes a target control condition formed as a region including a cross point of the first output value and the second output value,
wherein the cooling control portion is configured to adjust the rotation speed of the cooling motor to cause the first output value and the second output value to correspond to the target control condition,
wherein the cross point is an operational point to control the cooling fan, and
wherein the cooling control portion is further configured to determine whether the second output value is changed after a reference period of time, whether the first output value is changed when the second output value is changed and the communication state to be abnormal when the first output value is changed.

2. The cooling fan control system of claim 1, wherein the region of the target control condition is formed between a third output value that is greater by a reference output value than the cross point and a fourth output value that is less by the reference output value than the cross point, and the control condition includes a first control condition and a second control condition formed in a region other than the target control condition, wherein the third output value corresponds to the first output value and the second output value, and wherein the fourth output value corresponds to the first output value and the second output value.

3. The cooling fan control system of claim 2, wherein the region of the target control condition is formed between a first constant value that corresponds to the third output value and a second constant value that corresponds to the fourth output value, and the first constant value and the second constant value are proportional to the coolant temperature and the air-conditioner pressure.

4. A cooling fan control method for a vehicle, comprising:
generating, by a sensor, a first output value that corresponds to a coolant temperature;
generating, by the sensor, a second output value that corresponds to an air-conditioner pressure;
determining, by a controller, whether a communication state is abnormal by a cyclic redundancy check (CRC) or by an open or short circuit of a communication wire;
generating, by the controller, a control condition based on the first output value and the second output value;
adjusting, by the controller, a rotation speed of a cooling motor based on the control condition;
determining, by the controller, whether the second output value is changed after a reference period of time;
determining, by the controller, whether the first output value is changed when the second output value is changed; and
determining, by the controller, the communication state to be abnormal when the first output value is changed,
wherein the generating of the control condition includes forming a target control condition as a region including a cross point of the first output value and the second output value,
wherein the adjusting of the rotation speed of the cooling motor includes adjusting the rotation speed of the cooling motor to cause the first output value and the second output value to correspond to the target control condition,
wherein the cross point is an operational point to control the cooling fan.

5. The cooling fan control method of claim 4, wherein the forming of the target control condition is performed between a third output value that is greater by a reference output value than the cross point and a fourth output value that is less by the reference output value than the cross point, and the forming of the control condition includes generating a first control condition and a second control condition formed in a region other than the target control condition, wherein the third output value corresponds to the first output value and the second output value, and wherein the fourth output value corresponds to the first output value and the second output value.

6. The cooling fan control method of claim 5, wherein the forming of the target control condition is performed between a first constant value that corresponds to the third output value and a second constant value that corresponds to the fourth output value, and the first constant value and the second constant value are proportional to the coolant temperature and the air-conditioner pressure.

7. The cooling fan control method of claim 6, further comprising:
determining, by the controller, whether the first output value and the second output value correspond to the target control condition;
determining, by the controller, whether the first output value and the second output value correspond to the first control condition; and
determining, by the controller, whether the first output value and the second output value correspond to the second control condition,
wherein the adjustment includes maintaining a current rotation speed of the cooling motor when the first output value and the second output value correspond to the target control condition, and adjusting the rotation speed of the cooling motor to cause the first output value and the second output value to correspond to the target control condition when the first output value and the second output value correspond to the second control condition.

8. The cooling fan control method of claim 7, further comprising, when the first output value and the second output value do not correspond to the target control condition and the second control condition:
determining, by the controller, the first output value and the second output value to be the first control condition, and
adjusting, by the controller, the rotation speed of the cooling motor to cause the first output value and the second output value to correspond to the target control condition when the first output value and the second output value correspond to the first control condition.

9. The cooling fan control method of claim 4, further comprising:
determining, by the controller, whether the first output value is changed when the second output value is not changed; and
displaying, by the controller, a warning when the first output value is not changed.

10. A cooling fan control method for a vehicle, comprising:
generating, by a sensor, a first output value that corresponds to a coolant temperature;
generating, by the sensor, a second output value that corresponds to an air-conditioner pressure;
generating, by a controller, a control condition based on the first output value and the second output value;
adjusting, by the controller, a rotation speed of a cooling motor based on the control condition;
determining, by the controller, whether a current vehicle speed is equal to or greater than a first reference vehicle speed; and
determining, by the controller, whether the current vehicle speed is equal to or greater than a second reference vehicle speed,
wherein the generating of the control condition includes forming a target control condition formed as a region including a cross point of the first output value and the second output value,
wherein the adjustment of the rotation speed of the cooling motor includes adjusting the rotation speed of the cooling motor to cause the first output value and the second output value to correspond to the target control condition,
wherein the cross point is an operational point to control the cooling fan, and
wherein the adjustment includes:
adjusting, by the controller, the cooling motor to maximize the rotation speed of the cooling motor when the current vehicle speed is equal to or greater than the first reference vehicle speed;
adjusting, by the controller, the cooling motor to increase the rotation speed of the cooling motor to a first rotation speed when the current vehicle speed is not equal to or greater than the first reference vehicle speed and is equal to or greater than the second reference vehicle speed; and
adjusting, by the controller, the cooling motor to decrease the rotation speed of the cooling motor to a second rotation speed when the current vehicle speed is not equal to or greater than the first reference vehicle speed and is not equal to or greater than the second reference vehicle speed.

11. The cooling fan control method of claim 10, further comprising:
determining, by the controller, whether the second output value is changed after a reference period of time;
determining, by the controller, whether the first output value is changed when the second output value is changed; and
when the first output value is not changed, determining, by the controller, whether the current vehicle speed is equal to or greater than the first reference vehicle speed and determining whether the current vehicle speed is equal to or greater than the second reference vehicle speed.

12. The cooling fan control method of claim 11, further comprising:
determining, by the controller, whether the first output value is changed when the second output value is not changed, and
when the first output value is changed, determining, by the controller, whether the current vehicle speed is equal to or greater than the first reference vehicle speed and determining whether the current vehicle speed is equal to or greater than the second reference vehicle speed.

13. The cooling fan control method of claim 12, further comprising:
determining, by the controller, whether the first output value is changed when the second output value is not changed; and
displaying, by the controller, a warning when the first output value is not changed.

* * * * *